United States Patent
Beaulieu et al.

(10) Patent No.: US 12,533,820 B2
(45) Date of Patent: Jan. 27, 2026

(54) GRIPPING ASSEMBLY AND METHODS OF USE THEREOF

(71) Applicant: Toyota Research Institute, Inc., Los Altos, CA (US)

(72) Inventors: Andrew M. Beaulieu, Somerville, MA (US); Alexander Alspach, Somerville, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 966 days.

(21) Appl. No.: 17/715,482

(22) Filed: Apr. 7, 2022

(65) Prior Publication Data

US 2023/0321848 A1    Oct. 12, 2023

(51) Int. Cl.
   *B25J 15/10*    (2006.01)
   *B25J 13/08*    (2006.01)
   *B25J 15/12*    (2006.01)

(52) U.S. Cl.
   CPC ............. *B25J 15/10* (2013.01); *B25J 13/081* (2013.01); *B25J 15/12* (2013.01)

(58) Field of Classification Search
   CPC ... B25J 9/0015; B25J 15/0061; B25J 15/0253
   See application file for complete search history.

(56) References Cited

U.S. PATENT DOCUMENTS

| | | | |
|---|---|---|---|
| 2019/0091880 A1* | 3/2019 | Andre | B25J 15/08 |
| 2019/0168396 A1* | 6/2019 | Leidenfrost | B25J 9/1697 |
| 2020/0406477 A1* | 12/2020 | Jeremiah | B25J 9/1664 |
| 2021/0268663 A1* | 9/2021 | Gu | B25J 15/0009 |
| 2021/0362353 A1* | 11/2021 | Dürr | B25J 15/12 |
| 2021/0402622 A1* | 12/2021 | Hartmann | B25J 15/12 |
| 2023/0330869 A1* | 10/2023 | Beaulieu | B25J 15/12 |
| 2024/0066689 A1* | 2/2024 | Moghadam | B25J 9/0015 |
| 2025/0108520 A1* | 4/2025 | Riedel | B25J 15/0009 |

FOREIGN PATENT DOCUMENTS

| | | | | |
|---|---|---|---|---|
| CN | 108638115 A | | 10/2018 | |
| CN | 110480670 A | | 11/2019 | |
| CN | 107671878 B | | 11/2020 | |
| DE | 102020127017 | * | 1/2022 | |
| DE | 102022114600 A1 | * | 12/2023 | B25J 15/10 |
| EP | 2735408 B1 | | 4/2016 | |
| WO | 2019108952 A1 | | 6/2019 | |

OTHER PUBLICATIONS

Yang, et al.; A 3D-Printed Fin Ray Effect Inspired Soft Robotic Gripper with Force Feedback; (https://creativecommons.org/licenses/by/4.0/); pp. 1-18.

* cited by examiner

*Primary Examiner* — William A. Rivera
(74) *Attorney, Agent, or Firm* — Dinsmore & Shohl LLP

(57) ABSTRACT

A gripping assembly for gripping an object is provided. The gripping assembly includes a gripping member. The gripping member includes a mounting base and a plurality of fingers. The plurality of fingers include a central finger and a plurality of adjoining fingers. The central finger is slidably coupled to the mounting base such that the central finger is movable in a lateral direction. The plurality of adjoining fingers are positioned on opposing sides of the central finger in a longitudinal direction. Each of the plurality of adjoining fingers are pivotally coupled to the mounting base and coupled to the central finger such that a movement of the central finger in the lateral direction pivots the plurality of adjoining fingers with respect to the mounting base.

20 Claims, 7 Drawing Sheets

GRIPPING ASSEMBLY AND METHODS OF USE THEREOF

TECHNICAL FIELD

The present specification generally relates to a gripping assembly for gripping an object and, more specifically, a gripping assembly including at least two fin ray fingers that at least partially conform to the contour of the object.

BACKGROUND

It is known for robotic gripping members to include fin ray grippers that deform around an object grasped by the fin ray grippers. However, traditional fin ray grippers are fixed in positions and are not connected to each other. Accordingly, traditional fin ray grippers are limited in how the grippers deform around an object, and only deform around the object about a single axis. This can result in the object slipping out of the grasp of the fin ray grippers.

Accordingly, a need exists for alternative robotic gripping members that include fin ray grippers with coordinated movement.

SUMMARY

In one embodiment, a gripping assembly for gripping an object, the gripping assembly includes a gripping member. The gripping member includes a mounting base, and a plurality of fingers. The plurality of fingers includes a central finger and a plurality of adjoining fingers. The central finger is slidably coupled to the mounting base such that the central finger is movable in a lateral direction. The plurality of adjoining fingers are positioned on opposing sides of the central finger in a longitudinal direction, each of the plurality of adjoining fingers pivotally coupled to the mounting base and coupled to the central finger such that a movement of the central finger in the lateral direction pivots the plurality of adjoining fingers with respect to the mounting base.

In another embodiment, a robotic gripping assembly for gripping an object, the gripping assembly includes a gripping member. The gripping member includes a mounting base, a plurality of fingers, and a flexible membrane. The plurality of fingers are positioned along a longitudinal direction, each of the plurality of fingers pivotally coupled to the mounting base, each of the plurality of fingers comprises a contact portion with a contact surface. The flexible membrane is positioned between and coupling each adjacent finger of the plurality of fingers to coordinate movement between the plurality of fingers. The plurality of fingers are configured to move between an un-deformed position when the contact surface is not in a contact with an object and a deformed position when the contact surface is in contact with the object such that the plurality of fingers move to match at least a portion of a surface of the object.

In yet another embodiment, a method of gripping an object with a gripping assembly, the method includes actuating the gripping assembly. The gripping assembly includes a gripping member, a support member, and an actuator. The gripping member includes a mounting base and a plurality of fingers. The plurality of fingers include a central finger and a plurality of adjoining fingers. The central finger is slidably coupled to the mounting base such that the central finger is movable in a lateral direction. The plurality of adjoining fingers are positioned on opposing sides of the central finger in a longitudinal direction, each of the plurality of adjoining fingers pivotally coupled to the mounting base and coupled to the central finger such that a movement of the central finger in the lateral direction pivots the plurality of adjoining fingers with respect to the mounting base. Each of the plurality of fingers comprises a contact portion with a contact surface. The actuator is operatively coupled to the at least one of the gripping member and the support member, and is configured to move the at least one of the gripping member and the support member in the lateral direction. When the gripping assembly is actuated, the one of the gripping member and the support member moves toward the other of the gripping member and the support member to contact the object and move the plurality of fingers from on un-deformed position when the contact surface is not in a contact with the object to a deformed position when the contact surface is in contact with the object such that the plurality of fingers move to match at least a portion of a surface of the object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the appended figures, embodiments of the present disclosure are directed to gripping assemblies and methods of use that include a plurality of fingers that are connected by flexible membranes. The gripping assembly may be part of a robotic system. The gripping assembly is moveable between an un-deformed position and a deformed position where each of the plurality of fingers make coordinated movements without actuators to grasp an object. Conventional assemblies include finger fin grippers that are fixed in position and are not connected to each other. As such, these conventional assemblies do not move into the deformed position such that each of the plurality of fingers make coordinated movements to grasp the object by at least partially deforming to a contour of a surface of the object being grasped.

Embodiments disclosed herein provide the gripping assembly that includes a plurality of fingers that each move into the deformed position to at least partially conform to a contour of a surface of the object grasped such that the object may be at least partially surrounded by the plurality of fingers. Such embodiments provide for improvements in grasping and holding objects by increasing the amount of contact between each of the plurality of fingers and the surface of the object.

Further, the gripping assembly includes a base that each of the plurality of fingers are movably coupled thereto. The plurality of fingers include a central finger and a plurality of adjoining fingers positioned on opposing sides of the central finger. The central finger is slidably coupled to the base such that the central finger moves in a linear direction and the plurality of adjoining fingers are pivotally coupled to the base to pivotally move along an arcuate path when transitioning between the un-deformed position and the deformed position. The plurality of adjoining fingers are coupled to the central finger via a plurality of flexible membranes such that the linear movement of the central finger causes the plurality of adjoining fingers to pivot with respect to the central finger.

Various embodiments of the gripping member assembly and the methods of use thereof are described in more detail below.

Figure 1:
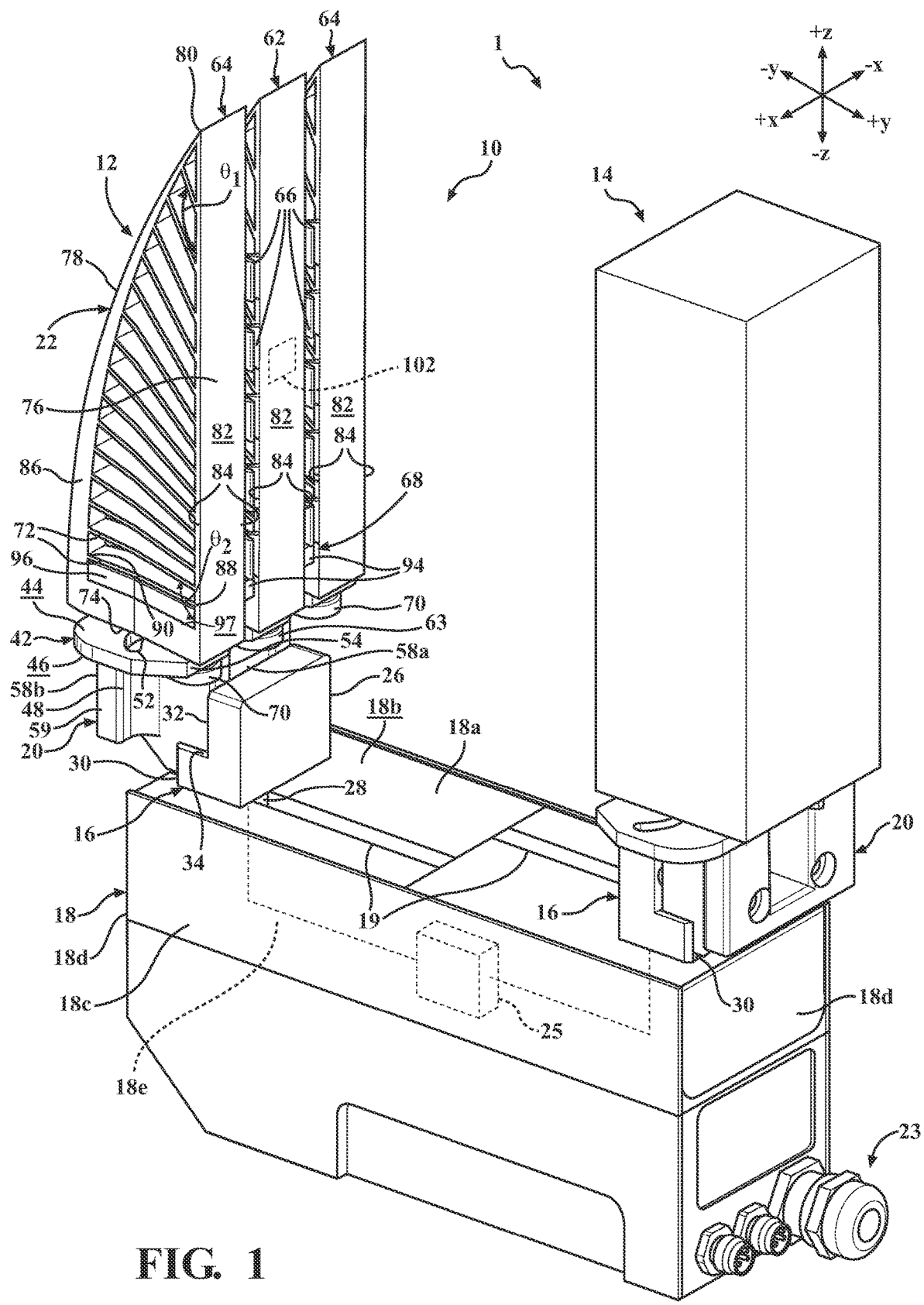
FIG. 1 schematically depicts a front perspective view of an example gripping assembly according to one or more embodiments shown and described herein.
Figure 2:
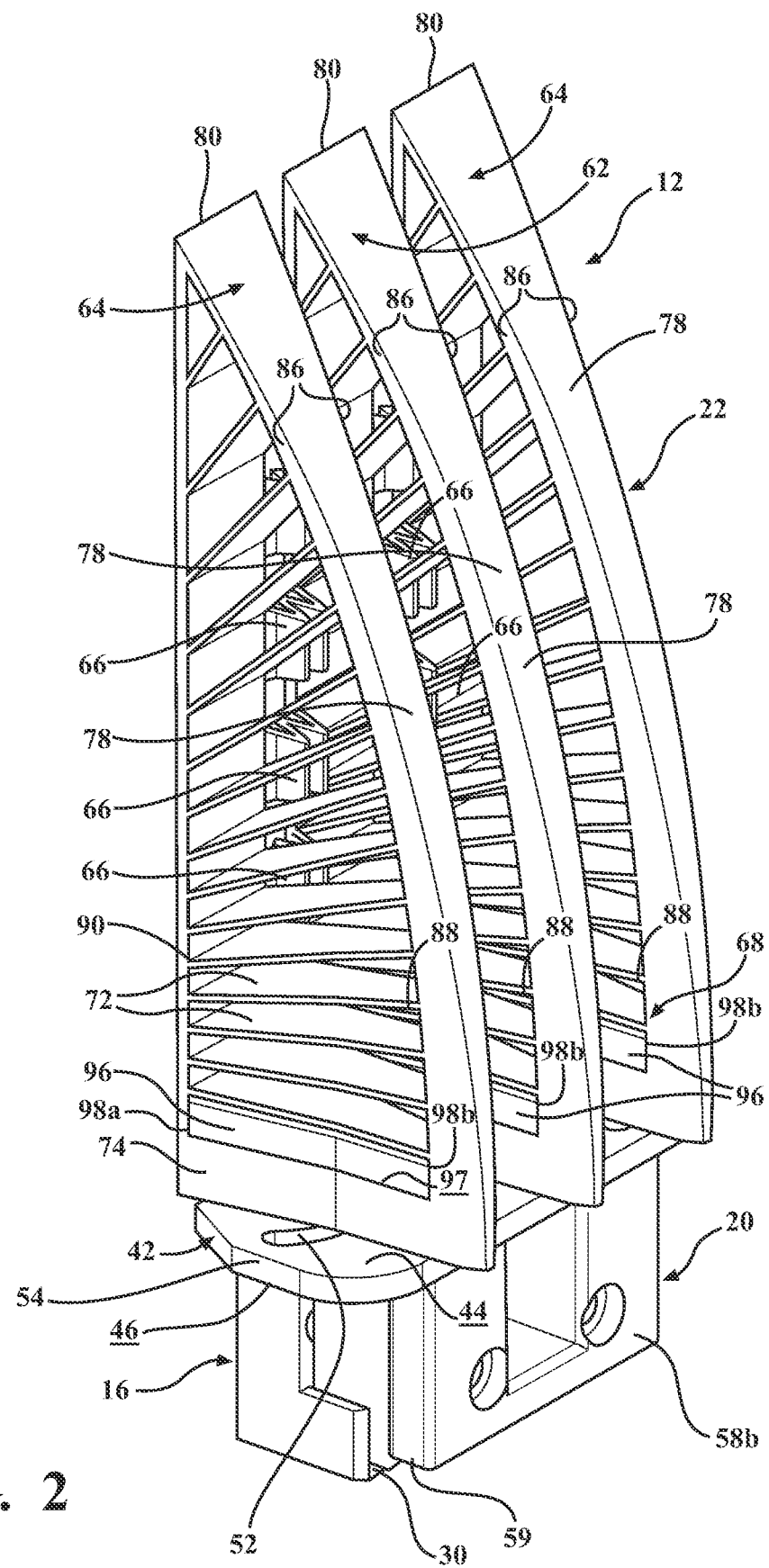
FIG. 2 schematically depicts a rear isolated perspective view of a gripping member of the example gripping assembly of FIG. 1 according to one or more embodiments shown and described herein.

As used herein, the term "longitudinal direction" refers to the forward-rearward direction of the robotic gripping assembly (i.e., in the +/−X direction depicted in FIG. 1). The term "lateral direction" refers to the cross-robotic gripping assembly direction (i.e., in the +/−Y direction depicted in FIG. 1), and is transverse to the longitudinal direction. The term "vertical direction" refers to the upward-downward direction of the robotic gripping assembly (i.e., in the +/−Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

Referring now to FIGS. 1-5 and 9, a robotic system 1 is provided. The robotic system 1 may be coupled to a robot such as an end effector of the robot or a stand-alone device. The robotic system 1 includes a gripping assembly 10. The gripping assembly 10 may include a gripping member 12, a support member 14, a housing 18, and a control system 24.

The housing 18 may include an upper wall 18a that includes a pair of slots 19 formed therein and that extend in a lateral direction (e.g., in the +/−Y direction).

In some embodiments, the pair of slots 19 may be axially offset from one another. In other embodiments, the pair of slots 19 are axially aligned with one another. The upper wall 18a includes an upper surface 18b that may be planar and extend between a pair of opposing sidewalls 18c and a pair of opposing end walls 18d. In some embodiments, a plurality of electrical and data connectors 23 may extend from at least one of the pair of opposing end walls 18d. In other embodiments, the plurality of electrical and data connectors 23 may extend from at least one of the pair of opposing sidewalls 18c and/or the upper wall 18a.

The pair of opposing sidewalls 18c and the pair of opposing end walls 18d define a cavity 18e formed below the upper wall 18a in the vertical direction (i.e., in the +/−Z-direction). In some embodiments, an actuator 25 may be operatively positioned within the cavity 18e. The actuator 25 may be, for example, a linear actuator, a rotary actuator, a pneumatic or hydraulic actuator, and/or the like. In other embodiments, the actuator 25 may be positioned anywhere within the robotic system 1 and not necessarily within the cavity 18e.

In some embodiments, the housing 18 further includes a mounting bracket 16 extending through one of the pair of slots 19 and is movably coupled to the actuator 25. The mounting bracket 16 includes a body portion 26 and a projection 28 that extends from the body portion 26 in a vertical direction (i.e., in the +/−Z direction) towards the upper wall 18a, through the slot 19 of the housing 18 and couples to the actuator 25. The body portion 26 may be an "L" shape that includes a vertically extending portion 32 and a laterally extending portion 34 that is perpendicular to the vertically extending portion 32. A step 30 may be defined in the body portion 26. The vertically extending portion 32, the laterally extending portion 34 and/or the step 30 may be adapted to receive at least a portion of the gripping member 12 and/or the support member 14 such that the gripping member 12 and/or the support member 14 may be moveably coupled to the body portion 26.

The mounting bracket 16 moves along a plurality of positions within the slot 19 in the lateral direction (i.e., in the +/−Y direction) via the projection 28. As such, the slot 19 may guide each respective mounting bracket 16 along the lateral direction (i.e., in the +/−Y direction) such that the mounting bracket 16 may move toward and away from each other in the lateral direction (i.e., in the +/−Y direction).

Figure 4:
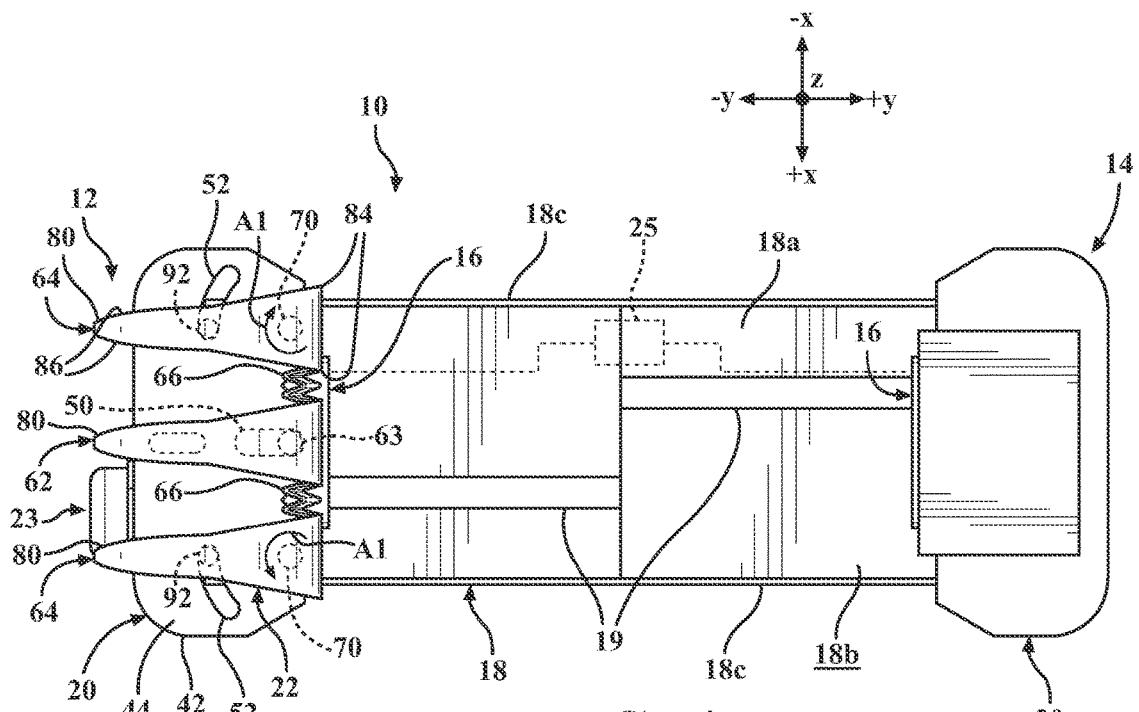
FIG. 4 schematically depicts a top view of the example gripping assembly of FIG. 1 in an un-deformed position, according to one or more embodiments shown and described herein.

Further, while FIGS. 1 and 4 illustrate a pair of mounting brackets 16 (e.g., the gripping member 12 coupled to one mounting bracket 16 and the support member 14 coupled to another mounting bracket 16), this is non-limiting as the mounting bracket 16 may be used in embodiments where only the gripping member 12 moves in the lateral direction (i.e., in the +/−Y direction) and the support member 14 is stationary, and vice versa.

The gripping member 12 may include a mounting base 20, a plurality of fingers 22, and a biasing member 68. The mounting base 20 may include a platform 42 with an upper surface 44 and an opposite lower surface 46. A body 48 may extend from the lower surface 46 of the platform 42 and couple to the body portion 26 of the mounting bracket 16 via links 51 and a plurality of fasteners, as discussed in greater detail herein. Example fasteners may include weld, adhesive, epoxy, bolts and nuts, rivets, screws, and/or the like.

The platform 42 may include a central slot 50 that extends in the lateral direction (i.e., in the +/−Y direction) and a pair of lateral slots 52 that each extend in an arcuate or curvilinear shaped path. Further, each of the pair of lateral slots 52 may be positioned on opposing sides of the central slot 50 in the longitudinal direction (i.e., in the +/−X direction). As such, the path of each of the pair of lateral slots 52 may extend in a direction towards a perimeter 54 of the platform 42 and away from the central slot 50. The perimeter 54 of the platform 42 may extend beyond the body 48 such that the platform 42 overhangs the body 48.

The body 48 may include an inner portion 58a that abuts the mounting bracket 16 and an opposite rear portion 58b that has a flange 59. The flange 58 may extend in the longitudinal direction (i.e., in the +/−X direction) and has a width in the longitudinal direction that is wider than the body 48. In some embodiments, the body 48 may be received in the step 30 of the mounting bracket 16 such that the inner portion 58a abuts the step 30 and the vertically extending portion 32. In other embodiments, the body 48 may be coupled anywhere to the mounting bracket 16. As such, the body 48 of the mounting base 20 may be fixedly coupled to the mounting bracket 16 in any operable manner, such as, for example, adhesive, epoxy, fasteners, welding, or the like.

The plurality of fingers 22 may include a central finger 62 and a plurality of adjoining fingers 64 positioned on opposing sides of the central finger 62 in the longitudinal direction (i.e., in the +/−X direction). A plurality of flexible membranes 66 are positioned between the central finger 62 and the plurality of adjoining fingers 64 such that each of the central finger 62 and the plurality of adjoining fingers 64 are movably coupled together by the plurality of flexible membranes 66. Each of the central finger 62 and the plurality of adjoining fingers 64 may comprise a plurality of ray fins 72, a bottom portion 74, a contact portion 76, a spine 78, and an apex 80. The contact portion 76 and the spine 78 may extend from the bottom portion 74 to adjoin at the apex 80. The spine 78 may be arcuate in shape while the contact surface is generally linear in shape. Further, the bottom portion 74 may be generally linear and spaces the spine 78 from the contact portion 76 such that the contact portion 76 and the spine 78 only come together or terminate at the apex 80.

The contact portion 76 may include a contact surface 82 and a pair of side edges 84 that extend in the vertical direction (i.e., in the +/−Z direction) along the length of the contact portion 76. The spine 78 may also include a pair of side edges 86 that extend substantially or generally in the vertical direction (i.e., in the +/−Z direction) to follow the curvature of the spine 78. Further, the pair of side edges 86 and the spine 78 may be curved such that the spine 78 tapers from the apex 80 toward the bottom portion 74. As such, in some embodiments, the spine 78 may be continuously tapered such that the pair of edge only meet or terminate at the bottom portion 74. In other embodiments, only portions of the spine 78 may be tapered.

Each of the plurality of ray fins 72 may extend between the contact portion 76 and the spine 78. Each of the plurality of ray fins 72 may include a first end 88 and an opposite second end 90 that define a length of each of the plurality of ray fins 72. As such, each of the plurality of ray fins 72 may be disposed between the contact portion 76 and the spine 78 such that the second end 90 is positioned adjacent to the spine 78 and the first end 88 is positioned adjacent to the contact portion 76.

Each of the plurality of ray fins 72 may extend between the spine 78 and the contact portion 76 at various lengths and at an angle that changes depending on where the ray fin of the plurality of ray fins 72 is positioned with respect to the apex 80 and the bottom portion 74. That is, the angle θ1 of the ray fin of the plurality of ray fins 72 is larger at the apex 80 than the angle θ2 at the bottom portion 74. The angle θ2 may be nearly perpendicular, or near 0 degrees, between the contact portion 76 and the spine 78 at the bottom portion 74 while the angle θ1 is a much larger oblique angle at the apex 80.

As such, each one of the plurality of ray fins 72 may extend at different oblique angles with respect to an adjacent ray fin of the plurality of ray fins 72 and may extend at an increased angle starting from the bottom portion 74 towards the apex 80. That is, the second end 90 of the ray fins 72 may be disposed at a distance from the mounting base 20 that is greater than a distance between the first end 88 and the mounting base 20. Further, each of the plurality of ray fins 72 may have a different length such that the length of each of the plurality of ray fins 72 extending between the first end 88 and the second end 90 decreases from the bottom portion 74 towards the apex 80.

Figure 3:
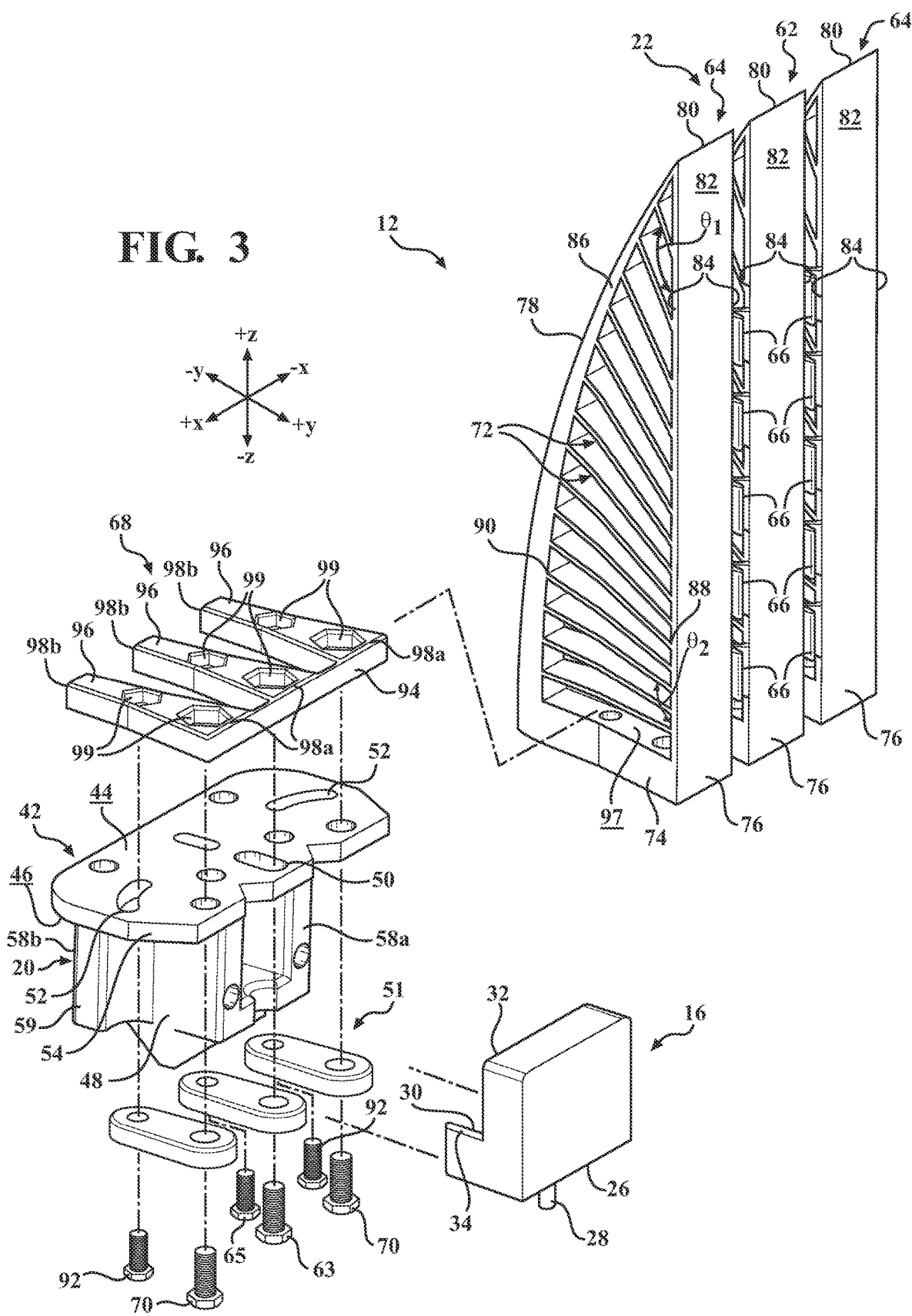
FIG. 3 schematically depicts an exploded view of the gripping member of the example gripping assembly of FIG. 1 according to one or more embodiments shown and described herein.

The central finger 62 may further include a projection, or fastener 63, extending through the central slot 50, through the bottom portion 74 and into the biasing member 68 to couple the central finger 62 to the mounting base 20, as best illustrated in FIG. 3. The fastener 63 of the central finger 62 may extend through the central slot 50 to slidably couple the central finger 62 to the mounting base 20 such that the central finger 62 is moveable in the lateral direction (i.e., in the +/−Y direction) relative to the mounting base 20. A second fastener 65 may be included to extend through the platform 42, through the bottom portion 74 and into the biasing member 68 to assist in coupling the central finger 62 to the mounting base 20, as best illustrated in FIG. 3.

Each of the plurality of adjoining fingers 64 may similarly include a projection, or fastener 92, extending through one of the plurality of lateral slots 52, through the bottom portion 74 and into the biasing member 68 to couple each of the plurality of adjoining fingers 64 to the mounting base 20, as best illustrated in FIG. 3. Further, each of the plurality of adjoining fingers 64 may be pivotally coupled to the platform 42 via a fastener 70 that extends through the platform 42, through the bottom portion 74 and into the biasing member 68 to form a pivot point for each of the plurality of adjoining fingers 64 to the mounting base 20, as best illustrated in FIG. 3. As such, the fastener 70 may form a pivot portion for each of the plurality of adjoining fingers 64.

Example fasteners may include screws, rivets, nuts and bolts, adhesive, epoxy, and/or the like. The fastener 70 may be spaced apart from the fastener 92 and the respective adjoining finger of the plurality of adjoining fingers 64 may rotate or pivot about the pivot portion defined at the fastener 70, as illustrated by arrow A1, while the fastener 92 guides the rotation or pivot of the respective adjoining finger of the plurality of adjoining fingers 64 along the respective lateral slots 52.

The plurality of adjoining fingers 64 are disposed on opposing sides of the central finger 62 in the longitudinal direction (i.e., in the +/−X direction). The plurality of adjoining fingers 64 may include any operable number of adjoining fingers 64 such as, for example, one, two, three, four, or more than four. The number of adjoining fingers 64 may be equivalent to the number of lateral slots 52 in the mounting base 20.

The plurality of flexible membranes 66 may extend between and couple adjacent fingers between the central finger 62 and the plurality of adjoining fingers 64 to join or couple the movement of the central finger 62 to the plurality of adjoining fingers 64. Further, in embodiments with additional adjoining fingers, the plurality of flexible membranes 66 may extend between the plurality of adjoining fingers 64 and the additional adjoining fingers. The plurality of flexible membranes 66 may movably couple the central finger 62 to the plurality of adjoining fingers 64 to coordinate movement between the plurality of adjoining fingers 64 with the displacement of the central finger 62 in the lateral direction (i.e., in the +/−Y direction).

The flexible membranes 66 may extend between and be coupled to the pair of side edges 84 of the central finger 62 and the plurality of adjoining fingers 64. Each of the central finger 62 and the plurality of adjoining fingers 64 may include multiple flexible membranes 66 arranged along the pair of side edges 84 of the central finger 62 and the adjacent finger of the plurality of adjoining fingers 64. The plurality of flexible membranes 66 may include any operable number of flexible membranes 66 for transferring motion from the central finger 62 to each one of the plurality of adjoining fingers 64. For example, the plurality of flexible membranes 66 may include any number of flexible membranes based on a number of factors including a height of the plurality of fingers 22, the desired amount of movement and speed of the movement, and the like, such that there may be one, two, three, four, five, or more than five flexible membranes between the central finger 62 and each adjacent finger of the plurality of adjoining fingers 64. The plurality of flexible membranes 66 may be formed of a flexible or resilient material, such as rubber, a plastic, or the like. Further, the plurality of flexible membranes 66 may be a mesh material or other suitable material that allows movement of the plurality of flexible membranes 66 between a resting state, as best illustrated in FIG. 4, and an expanded state, as best illustrated in FIG. 5.

Referring still to FIGS. 1-5, the biasing member 68 may include an elongated body 94 and a plurality of prongs 96 extending from the elongated body 94. The elongated body 94 of the biasing member 68 may extend between each of the central finger 62 and the plurality of adjoining fingers 64. The plurality of prongs 96 may each be spaced apart from the adjacent prongs 96 in the longitudinal direction (i.e., in the +/−X direction) and each may extend in a direction away from the elongated body 94 in the lateral direction (i.e., in the +/−Y direction). As such, the number of prongs of the plurality of prongs 96 may depend on the number of plurality of fingers 22. For example, in the example illustrated in FIG. 1, there are three fingers (e.g., the central finger 62 and the plurality of adjoining fingers 64 are a pair of fingers) and the biasing member 68 may include three prongs as the plurality of prongs 96. Further, each of the plurality of prongs 96 may taper from body end 98*a* to a terminating end 98*b* in which the body end 98*a* is in contact with the elongated body 94. Each of the plurality of prongs 96 may include openings 99 that are each configured to receive one of the fasteners 63, 65, 70, 92, as discussed in greater detail herein and as best illustrated in FIG. 3.

The biasing member 68 may be rigidly coupled to each of the central finger 62 and the plurality of adjoining fingers 64 to be positioned above the bottom portion 74 in the vertical direction (i.e., in the +/−Z direction). Further, each of the prongs 96 may be positioned between the contact portion 76 and the spine 78 of the respective finger of the set of fingers 22 (e.g., the elongated body 94 abuts the contact portion 76 and the terminating end 98*b* abuts the spine 78), and is positioned to be in contact with an inner surface 97 of the bottom portion 74. In other embodiments, each of the prongs 96 may be coupled to the respective fingers 22 via a press fit, adhesive, welding, epoxy, or the like. The biasing member 68 may be formed of a flexible material to allow the plurality of adjoining fingers 64 to pivot and move relative to the central finger 62 when a force is applied to the contact surface 82 of the contact portion 76, as discussed in greater detail herein. For example, the biasing member 68 may be a polycarbonate, polyethylene, kydex, acrylic, acrylonitrile butadiene styrene, polystyrene, polyether ether ketone, and/or the like.

Figure 5:
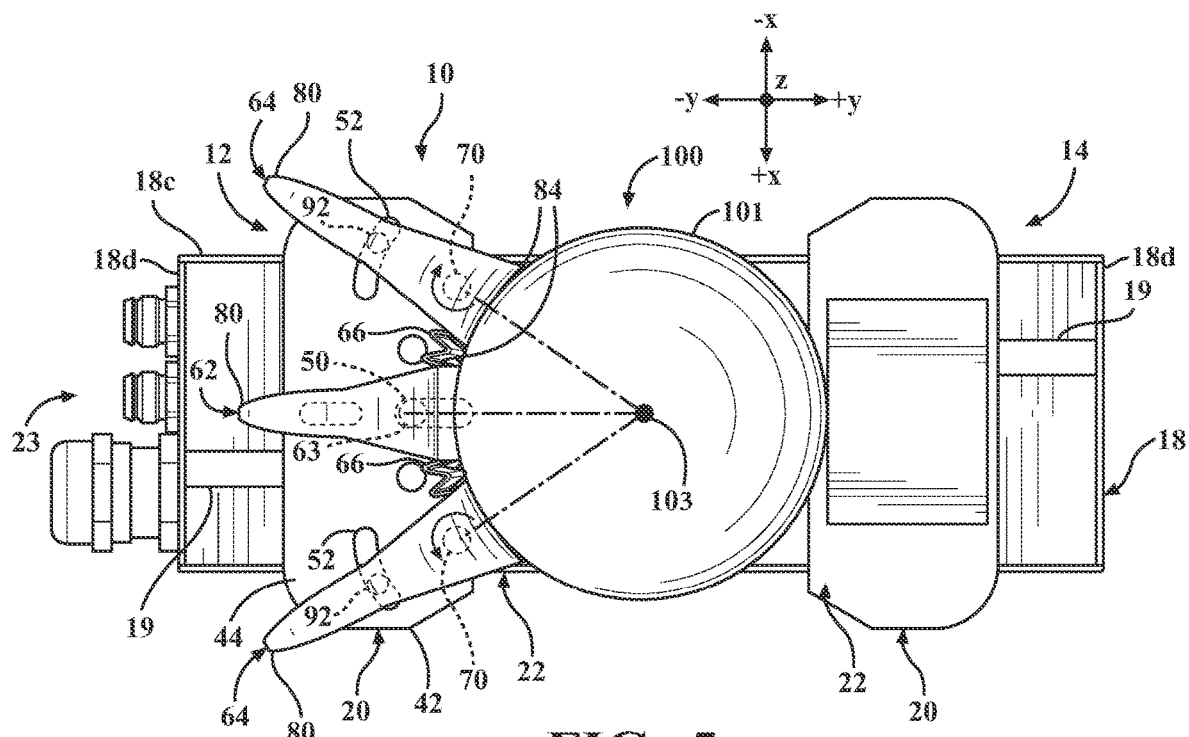
FIG. 5 schematically depicts a top view of the example gripping assembly of FIG. 1 in a deformed position, according to one or more embodiments shown and described herein.

Referring now to FIGS. 4 and 5, the plurality of fingers 22 may move between an un-deformed position, as best illustrated in FIG. 4, and a deformed position, as best illustrated in FIG. 5. In the un-deformed position, each of the contact surfaces 82 of the central finger 62 and the plurality of adjoining fingers 64 may be coplanar. A force exerted on the contact surface 82 of the plurality of fingers 22 transitions or moves the plurality of fingers 22 between the un-deformed position and the deformed position. As best illustrated in FIG. 5, an object 100 may be forced into the plurality of fingers 22 either by moving the gripping member 12 by the actuator 25 (FIG. 1) into the object 100, by the support member 14 moving the object 100 into the gripping member 12, and/or a combination thereof.

When transitioning or moving from the un-deformed position to the deformed position, the central finger 62 moves in the lateral direction (i.e., in the +/−Y direction) with the fastener 63 slidably moving along the central slot 50. The coupling of the central finger 62 to the plurality of adjoining fingers 64 via the flexible membranes 66 causes the adjoining fingers 64 to move along the lateral slots 52 and to rotate about the pivot point at the fastener 70 in the direction indicated by arrow A1 (e.g., away from the central finger 62) as the flexible membranes pull on the side edges 84 while moving from the resting state to the expanded state. As such, movement of the central finger 62 in the lateral direction (i.e., in the +/−Y direction) may cause a chain reaction movement of the plurality of adjoining fingers 64. The fasteners 92 slidably move along the lateral slots 52 while, simultaneously, the adjoining fingers 64 rotate about the fasteners 70 in the direction indicated by arrow A1.

The biasing member 68 (FIG. 1) may maintain the plurality of fingers 22 in the un-deformed position and bias the plurality of fingers 22 from the deformed position into the un-deformed position. As such, to move the plurality of fingers 22 from the un-deformed position into the deformed positon, the force on the contact surface 82 of the contact portion 76 is greater than the biasing force of the biasing member 68 (FIG. 1) and/or the force of the plurality of ray fins 72. In the deformed position, the contact surfaces 82 of the adjoining fingers 64 may extend obliquely to the contact surface 82 of the central finger 62 to face a center point 103 equally spaced apart from the contact surface 82 of the central finger 62 and the contact surfaces 82 of the adjoining fingers of the plurality of adjoining fingers 64 when the object is round, or spherical, and thus symmetrical, as depicted in FIG. 5.

That is, in the deformed position, the central finger 62 and the adjoining fingers 64 may move to at least partially follow or partially match the contour of the object 100 in contact with the contact surface 82 both in the respective slots 50, 52 and also the spine 78, the contact portion 76, and the plurality of ray fins 72 may also deform, bend, and/or buckle to help partially follow or partially match the contour or shape of a surface 101 of the object 100. That is, the deforming, bending, and/or buckling of the spine 78, the contact portion 76, and the plurality of ray fins 72 cause the contact surfaces 82 to curve around the object 100.

In embodiments where the object 100 is not symmetrical along the surface 101, the amount of deformation, movement in the slots 50, 52 and the like, may vary between the plurality of fingers 22. For example, one of the plurality of adjoining fingers 64 may pivot more in the lateral slot 52 about the fastener 70 in the direction of A1 than the other plurality of adjoining fingers 64. Further, one of the plurality of adjoining fingers 64 may deform a greater amount that another one of the plurality of adjoining fingers 64.

As such, the plurality of fingers 22 make coordinated movements to grasp the object 100 by at least partially deforming to a contour of the surface of the object 100 being grasped. Such embodiments provide for improvements in grasping and holding the object 100 by increasing the amount of contact between each of the plurality of fingers 22 and the surface 101 of the object 100.

Referring again to FIGS. 1-5, the support member 14 may be any structure capable of holding the object 100, providing support to the object 100 for the gripping member 12, moving the object into the gripping member 12, and/or the like. In some embodiments, the support member may be the same structure as the gripping member 12. In other embodiments, the support member 14 may contain some of the structure of the gripping member 12 such as only the central finger 62. In other embodiments, the support member may be a rigid material that can perform the functionality described above with respect to the support member 14.

The support member 14 may be positioned spaced apart from the gripping member 12 such that the object 100 may be gripped between the support member 14 and the gripping member 12. In some embodiments, the mounting bracket 16 of the support member 14 may move along the slot 19 in the upper wall 18a of the housing 18 in the lateral direction (e.g., in the +/−Y direction) toward the gripping member 12. The gripping member 12 may remain stationary or may move along the other slot 19 in the housing 18 in the lateral direction (i.e., in the +/−Y direction) such that the object 100 is squeezed between the support member 14 and the gripping member 12. The actuator 25 operatively coupled to the mounting brackets 16 of the gripping member 12 and the support member 14 moves the gripping member 12 and/or the support member 14 along the slots 19 of the upper wall 18a of the housing 18.

Upon contact between the gripping member 12 and the support member 14 onto the object 100, the contact between the object and the central finger 62 displaces the central finger 62 in the lateral direction (i.e., in the +/−Y direction) along the central slot 50. The movement of the central finger 62 in the lateral direction (i.e., in the +/−Y direction) pivots the plurality of adjoining fingers 64 about the fastener in the direction of arrow A1. The adjacent fingers of the plurality of adjoining fingers 64 to the central finger 62 may pivot in the direction of A1 from the pulling action of the plurality of flexible membranes 66 caused from the displacement of the central finger 62.

As such the plurality of adjoining fingers 64 may pivot about the fastener 70 in the direction of A1 and move within the lateral slot 52 such that the contact surfaces 82 of each of the central finger 62 and the plurality of adjoining fingers 64 may be generally concave to circumferentially surround at least a portion of the surface 101 of the object 100. The ray fins 72 of each of the central finger 62 and the plurality of adjoining fingers 64 may buckle when the contact surfaces 82 of the central finger 62 and the plurality of adjoining fingers 64 contact the object, causing the contact surfaces 82 to curve around at least a portion of the surface 101 of the object 100.

Figure 6:
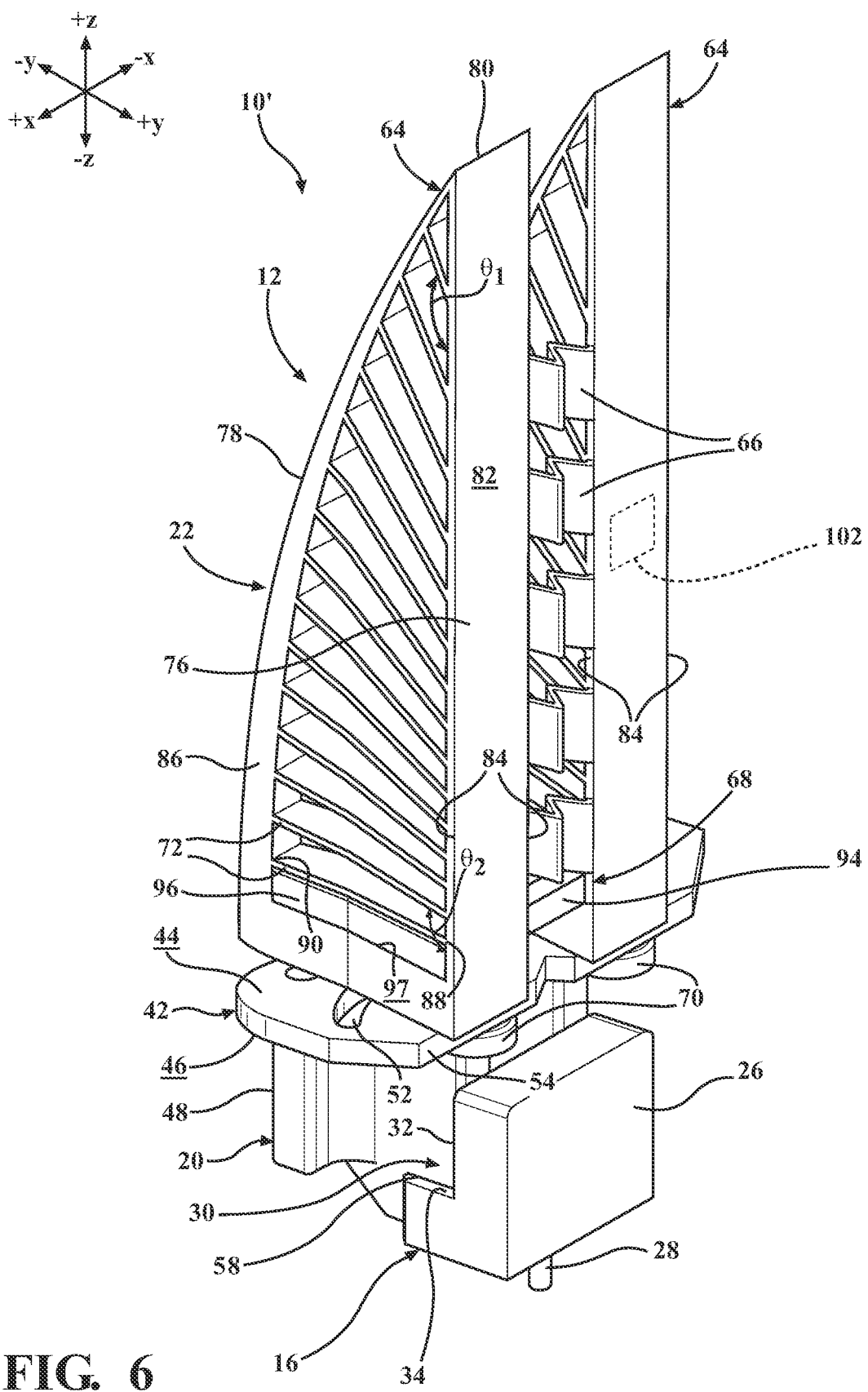
FIG. 6 schematically depicts a perspective view of a gripping member of a second example gripping assembly, according to one or more embodiments shown and described herein.
Figure 7:
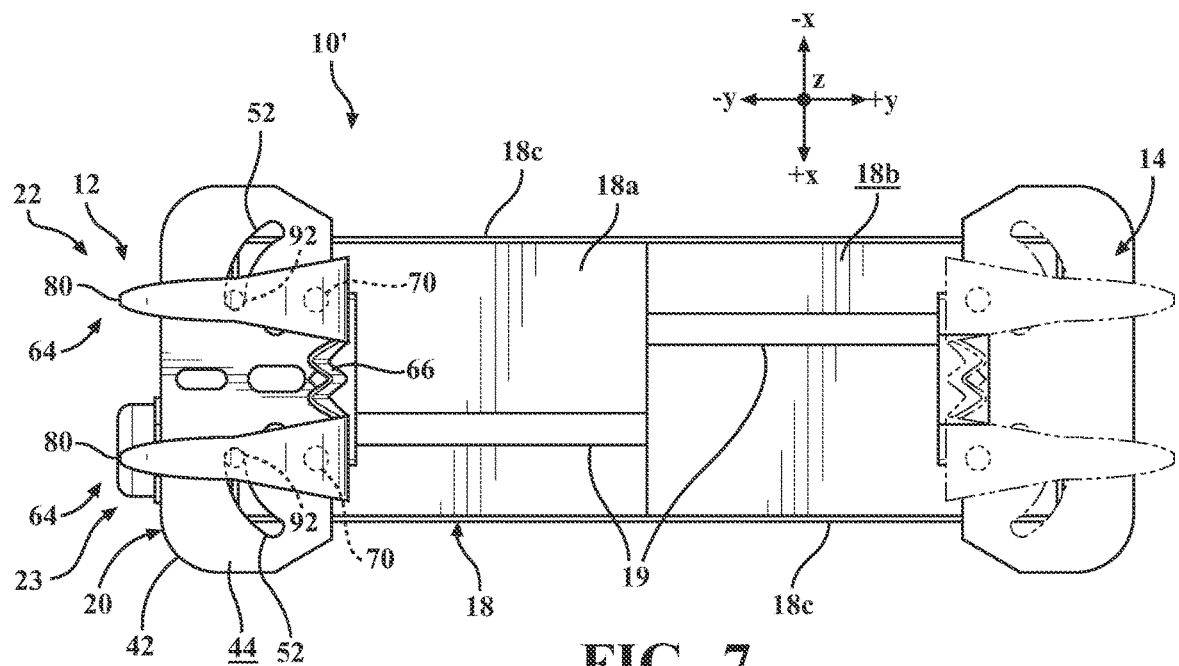
FIG. 7 schematically depicts a top view of the second example gripping assembly of FIG. 6 in an un-deformed position, according to one or more embodiments shown and described herein.
Figure 8:
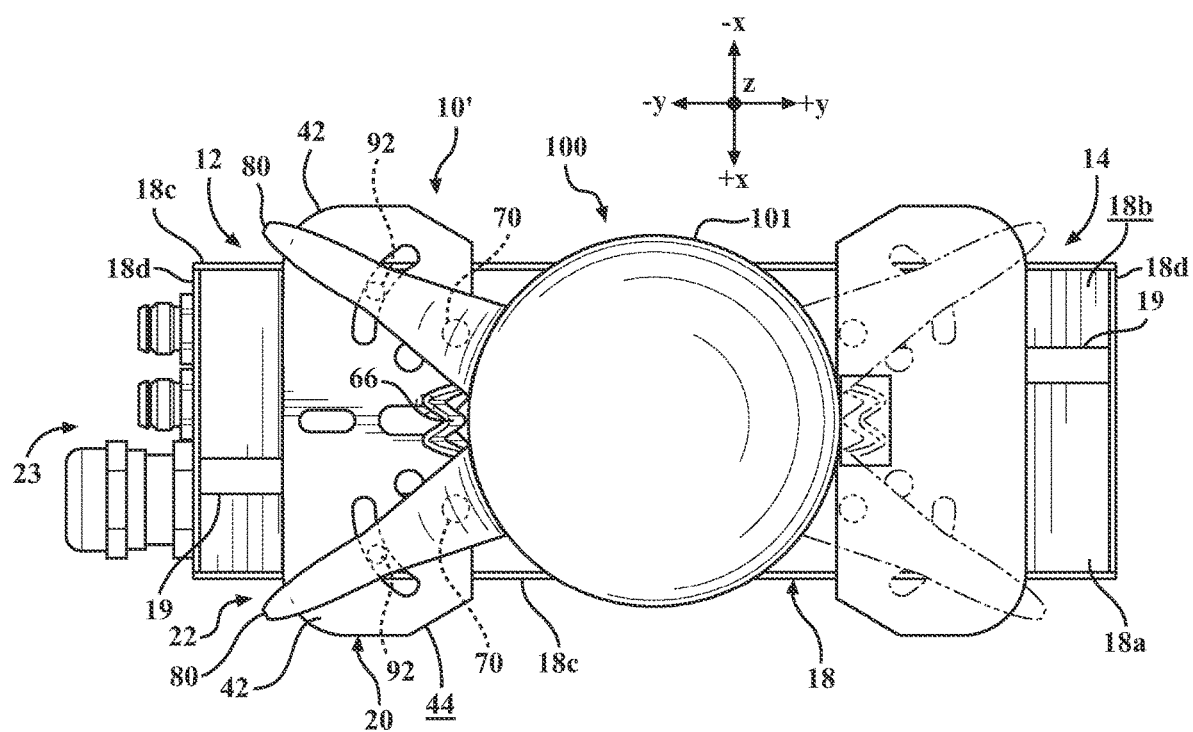
FIG. 8 schematically depicts a top view of the second example gripping assembly of FIG. 6 in a deformed position, according to one or more embodiments shown and described herein.

Referring now to FIGS. 6-8, an alternative gripping assembly 10' is depicted. The alternative gripping assembly 10' includes substantially the same structure as the gripping assembly 10 described above with respect to FIGS. 1-5, and like structure will use the same reference numerals and will not be described again for brevity reasons. The alternative gripping assembly 10' differs in that the gripping assembly 10' includes an even number of the plurality of fingers 22. The plurality of fingers 22 may include the plurality of adjoining fingers 64 without the central finger 62 disposed therebetween. The plurality of adjoining fingers 64 are described above and will not be described again for brevity reasons.

The plurality of adjoining fingers 64 may each be coupled directly to an adjacent adjoining finger of the plurality of adjoining fingers 64 by the plurality of flexible membranes 66. Each of the plurality of adjoining fingers 64 may pivot about the fastener 70 in the direction of arrow A1 upon contact with the object such that the plurality of adjoining fingers 64 conform to the surface 101 of the object 100. The plurality of adjoining fingers 64 may pivot when one of the contact surfaces 82 are in contact with the object 100 and the plurality of flexible membranes 66 pull or move the other plurality of adjoining fingers 64. As such that the contact surfaces 82 of the plurality of adjoining fingers 64 may be concave to conform to the shape of the object 100. The plurality of adjoining fingers 64 may include any operable number of adjoining fingers 64, such as two, four, or more than four.

Figure 9:
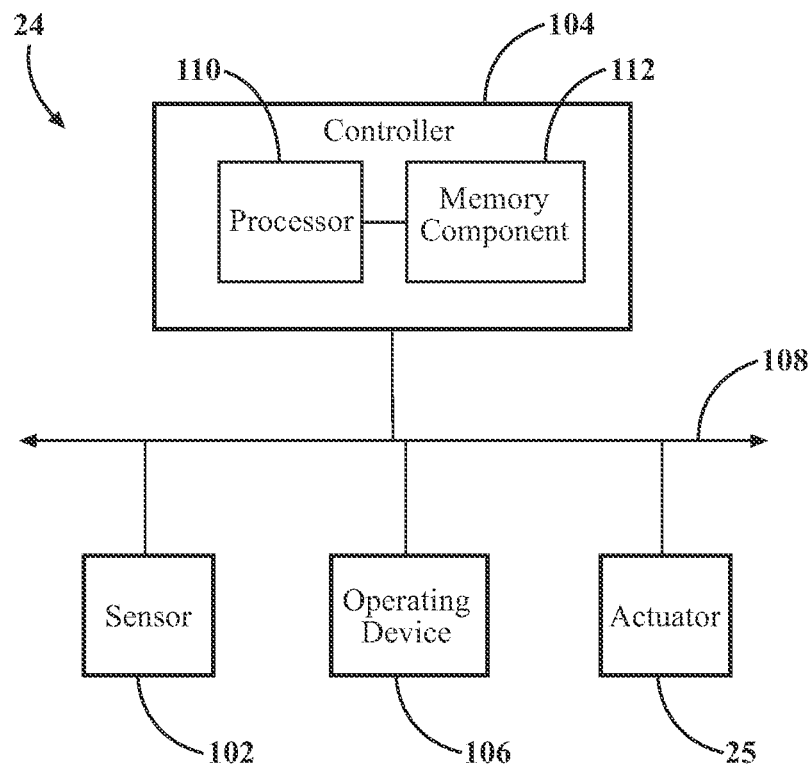
FIG. 9 schematically depicts a control system for operating the example gripping assembly of FIG. 1, according to one or more embodiments shown and described herein.

Referring now to FIGS. 1 and 9, the control system 24 may include a sensor 102, a controller 104, an operating device 106, and a communication path 108. The controller 104 includes a processor 110 and a non-transitory electronic memory 112 to which various components are communicatively coupled. In some embodiments, the processor 110 and the non-transitory electronic memory 112 and/or the other components are included within a single device. In other embodiments, the processor 110 and the non-transitory electronic memory 112 and/or the other components may be distributed among multiple devices that are communicatively coupled. The non-transitory electronic memory 112 stores a set of machine-readable instructions. The processor 110 executes the machine-readable instructions stored in the non-transitory electronic memory 112. The non-transitory electronic memory 112 may comprise RAM, ROM, flash memories, hard drives, or any device capable of storing machine-readable instructions such that the machine-readable instructions can be accessed by the processor 110. Accordingly, the control system 24 described herein may be implemented in any conventional computer programming language, as pre-programmed hardware elements, or as a combination of hardware and software components. The non-transitory electronic memory 112 may be implemented as one memory module or a plurality of memory modules. As such, the controller 104 may be a central processing unit, an electronic control unit, and/or the like.

The processor 110 may be any device capable of executing machine-readable instructions. For example, the processor 110 may be an integrated circuit, a microchip, a computer, or any other computing device. The non-transitory electronic memory 112 and the processor 110 are coupled to the communication path 108 that provides signal interconnectivity between various components and/or modules of the actuation system. Accordingly, the communication path 108 may communicatively couple any number of processors with one another, and allow the modules coupled to the communication path 108 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like, data transfer, and/or the like.

As schematically depicted in FIG. 9, the communication path 108 communicatively couples the processor 110 and the non-transitory electronic memory 112 of the controller 104 with a plurality of other components of the control system 24. For example, the control system 24 depicted in FIG. 9 includes the processor 110 and the non-transitory electronic memory 112 communicatively coupled with the operating device 106, the sensor 102, and the actuator 25.

The operating device 106 allows for a user to control operation of the gripping assembly 10. In some embodiments, the operating device 106 may be a switch, toggle, button, joystick, human machine interface, portable hand controller, and/or any combination of controls to provide user operation. As a non-limiting example, a user may actuate the gripping member 12 by activating controls of the operating device 106 to a first position via the actuator 25. While in the first position, the gripping member 12 will remain in an actuated state. The user may switch the gripping member 12 into a non-actuated state by operating the controls of the operating device 106 out of the first position and into a second position.

The operating device 106 is coupled to the communication path 108 such that the communication path 108 communicatively couples the operating device 106 to other modules of the control system 24. The operating device 106 may provide a user interface for receiving user instructions as to a specific operating configuration of the gripping member. In addition, user instructions may include instructions to operate the gripping member only at certain conditions.

The sensor 102 may be configured to detect when the contact surface 82 of each of the plurality of fingers 22 contact the object 100. The sensor 102 may be a piezoelectric sensor, a force sensor, a proximately switch, a laser switch, and/or the like. The sensor 102 may be positioned on the contact surface 82 of one of the central finger 62 and the plurality of adjoining fingers 64. In embodiments, the sensor 102 may be positioned on each of the central finger 62 and the plurality of adjoining fingers 64. The controller 104 may be configured to receive signals from the sensor 102 indicative of the contact surface 82 of one or more of the central finger 62 and the plurality of adjoining fingers 64 contacting the object. In embodiments, the controller 104 may be configured to receive signals from the sensor 102 indicative of a force acting on the central finger 62 and the plurality of adjoining fingers 64 from the contact with the object. The controller 104 may control operation of the actuator 25 based on whether the detected force is greater than a threshold force. The threshold force may be a force required to buckle the ray fins 72 and deform the central finger 62 and the adjoining fingers 64 around the object.

The controller 104 may operate the actuator 25 in response to the signal received from the sensor 102. The controller 104 may actuate the actuator 25 to move the gripping member 12 and the support member 14 toward one another such that the set of fingers 22 of each of the gripping member 12 and the support member 14 grip the object. The controller 104 may actuate the actuator 25 until the sensor 102 detects that the central finger 62 and the plurality of adjoining fingers 64 are contacting the object. In embodiments, the controller 104 may continue to actuate the actuator 25 after contact between the central finger 62 and the plurality of adjoining fingers 64 and the object until the threshold force is detected by the sensor 102.

Figure 10:
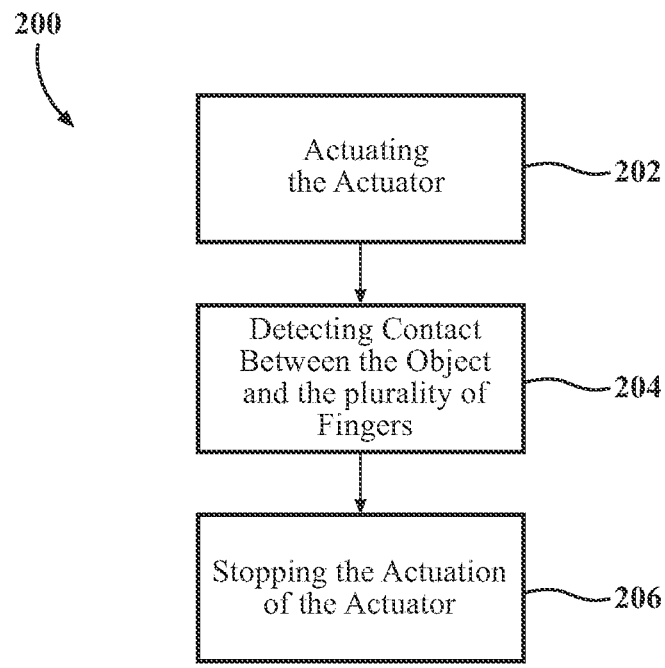
FIG. 10 depicts a flowchart of an illustrative method of operating the example gripping assembly of FIG. 1, according to one or more embodiments shown and described herein.

Referring now to FIGS. 1 and 10, a method 200 of operating the gripping assembly 10 is disclosed. At step 202, the method 200 may include actuating the actuator 25. Upon actuation of the actuator 25, the mounting brackets 16 of the gripping member 12 and the support member 14 are moved in the longitudinal direction (e.g., in the +/−Y direction) to move the set of fingers 22 of each of the gripping member 12 and the support member 14 toward one another to grasp the object. When the set of fingers 22 contacts the object, the contact with the object moves the central finger 62 in the longitudinal direction, thereby rotating the plurality of adjoining fingers 64 via the flexible membranes 66. The contact with the object further causes the ray fins 72 in the central finger 62 and the plurality of adjoining fingers 64 to buckle, thereby deforming each of the central finger 62 and the plurality of adjoining fingers 64 such that the respective contact surfaces 82 conform around the object. At step 204, the method 200 may include detecting the contact between the object and the set of fingers 22 with the sensor 102 such that the sensor 102 may detect a force between the object and the set of fingers 22. The controller 104 may determine whether the detected force is greater than the threshold force. At step 206, the controller 104 may cease actuation of the actuator 25 upon receiving the signal from the sensor 102 being indicative of either contact between the object and the set of fingers 22, or the detected force is greater than the threshold force.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A gripping assembly for gripping an object, the gripping assembly comprising:
    a gripping member comprising:
    a mounting base;
    a plurality of fingers comprising:
    a central finger slidably coupled to the mounting base such that the central finger is movable in a lateral direction; and
    a plurality of adjoining fingers positioned on opposing sides of the central finger in a longitudinal direction, each of the plurality of adjoining fingers pivotally coupled to the mounting base and coupled to the central finger such that a movement of the central finger in the lateral direction pivots the plurality of adjoining fingers with respect to the mounting base.

2. The gripping assembly of claim 1, wherein the central finger and each of the plurality of adjoining fingers further comprising:
    a contact portion with a contact surface,
    wherein the central finger and the plurality of adjoining fingers move between an un-deformed position when the contact surface is not in a contact with the object and a deformed position when the contact surface is in contact with the object such that the central finger and the plurality of adjoining fingers move to match at least a portion of a surface of the object.

3. The gripping assembly of claim 2, further comprising:
a flexible membrane positioned between the central finger and each one of the plurality of adjoining fingers adjacent to the central finger, the flexible membrane extends between a first side edge of the central finger and a first side edge of one of the plurality of adjoining fingers and a second side edge of the central finger and a second side edge of the other one of the plurality of adjoining fingers.

4. The gripping assembly of claim 2, further comprising:
a platform having an upper surface and an opposite lower surface, the lower surface is coupled to a body portion of the mounting base, the plurality of fingers moveably coupled to the upper surface of the platform.

5. The gripping assembly of claim 4, wherein the central finger of the plurality of fingers is moveably coupled to the platform via a central slot.

6. The gripping assembly of claim 5, wherein the central finger moves in the lateral direction along the central slot when the object makes contact with the contact surface of the central finger.

7. The gripping assembly of claim 4, wherein the plurality of adjoining fingers of the plurality of fingers are moveably coupled to the platform via a pair of lateral slots positioned on each side of a central slot.

8. The gripping assembly of claim 7, wherein each one of the plurality of adjoining fingers pivot about a pivot portion of the platform and move within the respective pair of lateral slots when the object makes contact with the contact surface of the plurality of adjoining fingers or the central finger.

9. The gripping assembly of claim 2, wherein each of the plurality of fingers include a bottom portion coupled to the mounting base and a spine positioned opposite the contact portion connect to the bottom portion and to the contact portion at an apex, the spine is tapered from the apex toward the bottom portion.

10. The gripping assembly of claim 2, further comprising:
a sensor configured to detect when the contact surface of the plurality of fingers contact the object.

11. The gripping assembly of claim 1, wherein each of the plurality of fingers is formed of a plurality of ray fins.

12. A robotic gripping assembly for gripping an object, the gripping assembly comprising:
a gripping member comprising:
a mounting base;
a plurality of fingers positioned along a longitudinal direction, each of the plurality of fingers movably coupled to the mounting base, each of the plurality of fingers comprises a contact portion with a contact surface; and
a flexible membrane positioned between and coupling each adjacent finger of the plurality of fingers to coordinate movement between the plurality of fingers, the plurality of fingers are configured to move between an un-deformed position when the contact surface is not in a contact with the object and a deformed position when the contact surface is in contact with the object such that the plurality of fingers move to match at least a portion of a surface of the object.

13. The gripping assembly of claim 12, wherein each of the plurality of fingers further comprising:
a pair of side edges on each side of the contact surface, wherein the flexible membrane extends between one of the side edges of one of the plurality of fingers and one of the side edges of the adjacent finger of the plurality of fingers.

14. The gripping assembly of claim 13, further comprising:
a platform having an upper surface and an opposite lower surface, the lower surface is coupled to a body portion of the mounting base, the plurality of fingers moveably coupled to the upper surface of the platform.

15. The gripping assembly of claim 14, wherein at least two of the plurality of fingers are moveably coupled to the platform via a pair of lateral slots respectively.

16. The gripping assembly of claim 15, wherein each one of the plurality of fingers pivot about a pivot portion of the platform and move within the respective pair of lateral slots in the deformed position.

17. The gripping assembly of claim 13, wherein the plurality of fingers each comprise a bottom portion coupled to the mounting base, and a spine opposite the contact surface, the spine comprising a pair of spine side edges that are curved such that the spine is tapered toward the bottom portion of each of the plurality of fingers.

18. The gripping assembly of claim 12, further comprising:
a sensor configured to detect when the contact surface of the plurality of fingers contact the object.

19. The gripping assembly of claim 12, wherein each of the plurality of fingers is formed of a plurality of ray fins.

20. A method of gripping an object with a gripping assembly, the method comprising:
actuating the gripping assembly, the gripping assembly comprising:
a gripping member comprising:
a mounting base;
a plurality of fingers comprising:
a central finger slidably coupled to the mounting base such that the central finger is movable in a lateral direction; and
a plurality of adjoining fingers positioned on opposing sides of the central finger in a longitudinal direction, each of the plurality of adjoining fingers pivotally coupled to the mounting base and coupled to the central finger such that a movement of the central finger in the lateral direction pivots the plurality of adjoining fingers with respect to the mounting base,
each of the plurality of fingers further having a contact portion with a contact surface;
a support member; and
an actuator operatively coupled to the at least one of the gripping member and the support member, the actuator configured to move the at least one of the gripping member and the support member in the lateral direction,
wherein when the gripping assembly is actuated, the one of the gripping member and the support member moves toward the other of the gripping member and the support member to contact the object and move the plurality of fingers from an un-deformed position when the contact surface is not in a contact with the object to a deformed position when the contact surface is in contact with the object such that the plurality of fingers move to match at least a portion of a surface of the object.

* * * * *